3,639,584
METHOD FOR PROMOTING WEIGHT GAIN IN BRONZE TURKEYS

Eldon W. Klenholz, Fort Collins, Colo., assignor to Colorado State University Research Foundation, Fort Collins, Colo.
No Drawing. Filed July 1, 1968, Ser. No. 741,263
Int. Cl. A61k 27/00
U.S. Cl. 424—127                                                    2 Claims

ABSTRACT OF THE DISCLOSURE

This invention relates to a novel method for improving the weight gain in bronze turkeys, both male and female, which comprises dissolving in their drinking water a substantial concentration of sodium nitrate for their continued consumption from the hatching date or shortly thereafter up through not less than approximately two nor more than approximately six weeks of age.

---

The day is fast approaching when most, if not all, of the poultry raised for market will originate in commercial hatcheries having one hundred thousand birds and more in various stages of growth. The resultant efficiency and economy that is the natural outgrowth of a well-managed operation of this type make it very difficult for the smaller hatchery to compete.

In this type of large commercial operation, even a fraction of a pound again in average weight of the birds at market age can result in a truly significant increase in both gross and net profit provided, of course, that the means by which such weight gain is achieved is not more costly than the benefits derived therefrom.

It has now been found in accordance with the teaching of the instant invention that roughly a one pound increase in the average weight of male turkeys of the bronze type can be expected at near five months of age if these turkeys are required to drink water containing a concentration of about 1000 p.p.m. of sodium nitrate from their hatching date or shortly thereafter until they are, preferably, around a month old. Analogous results were also obtained with the female turkeys of this same type, although the weight gain was not nearly as significant as with the males.

Prior art studies by a skilled poultry nutritionist investigating sodium nitrate as a dietary supplement for turkeys showed no evidence whatsoever of the compound having any beneficial effect on final body weight. It is experiments such as these that make the results realized by the method of the instant invention even more amazing and certainly unexpected.

Also, the prior art studies of the effect of nitrates on human infants show that levels as low as 10–20 p.p.m. produces the so-called "blue baby" symptoms which, of course, can be fatal. Nitrates in the blood stream of humans and some animals can be converted rather easily to nitrites by certain bacteria and these nitrites, in turn, change blood hemoglobin to methemoglobin. Methemoglobin, unlike hemoglobin, cannot carry oxygen, and the tissues ordinarily nurtured thereby die. It is for this reason that the United States Public Health Service recommends against using water for domestic animals containing over 50 p.p.m. of contained nitrates. Thus, there certainly would be a strong suspicion that nitrate levels as much as forty times that considered the maximum safe level by the public health officials would be quite toxic and more than likely result in the death of the poults; yet, for some inexplicable reason, the tests apparently resulted in a redirection, rather than an increase, in blood methemoglobin, although they cannot be considered conclusive either way.

Accordingly, despite a fair amount of reliable evidence indicating that the introduction of sodium nitrate into the turkey poult feed as a dietary supplement would not only fail to produce any beneficial results in terms of an overall weight gain but would also likely prove so toxic that it would kill the birds, the actual experimental results unexpectedly showed the compound to be both non-toxic and highly effective as a growth-promoting additive when administered in accordance with the teaching of the instant invention.

It is, therefore, the principal object of the present invention to provide a novel and totally unexpected method for improving the weight gain in bronze turkey poults.

A second objective is the provision of a method of the type aforementioned which, up to the present time at least, has proven to be entirely safe for animals.

Another object is to provide a method for increasing the growth rate in a certain specie of domestic fowl that is most attractive from the economical standpoint as the resultant gain in market weight far exceeds the cost of administering dietary supplement.

Still another objective of the invention herein disclosed and claimed is to provide a means for increasing the market weight of bronze turkey poults that utilizes a very common and inexpensive chemical salt, namely, sodium nitrate as the dietary supplement.

An additional object is to provide a method for introducing a supplement into the feed for turkey poults that fits easily into the normal feeding routine and involves little, if any, extra time or effort.

A further object is to provide an improved method of fattening turkeys for market that is safe, efficient, easily integrated into normal feeding routines, requires no special equipment and is readily incorporated into existing poultry farming operations, both large and small.

Other objects will be in part apparent and in part pointed out specifically hereinafter in connection with the detailed description that follows.

In the initial experiment, five separate groups containing one hundred newly-hatched bronze male turkeys in each group were housed on wire screens in batteries at about 70° F. The control group received ordinary unadulterated drinking water while the water given to all of the test groups contained measured quantities of sodium nitrate. The first of the test groups was given 225 p.p.m. sodium nitrate on a contained nitrate basis, while each of the other test groups was given three and nine times this amount, respectively. The results of this early experiment are shown tabulated in Table I below:

TABLE I.—EFFECT OF SODIUM NITRATE ON BRONZE TURKEYS (MALE)

| Nitrate in water (p.p.m.) | Avg. body wt. (lbs.) | | | Water/gain (0–4 wk.) |
|---|---|---|---|---|
| | 4 wks. | 8 wks. | 21 wks. | |
| 0 | 1.42 | ¹5.69 | 21.3 | 4.9 |
| 225 | 1.39 | 5.80 | 21.7 | 5.0 |
| 675 | 1.41 | ¹5.82 | 22.2 | 4.9 |
| 2,025 | 1.29 | 5.56 | 21.4 | 5.0 |

¹ Different from each other at 1% level of significance.

Some interesting facts can be gleaned from the results shown in this table. For instance, at four weeks of age, at which point the nitrate treatment was discontinued, and also at eight weeks, the average body weight of the group that had been receiving the maximum dosage of sodium nitrate experienced a growth depression, although they caught up and were nearly average by 21 weeks. Overall, however, the group receiving the highest level of sodium nitrate showed no statistically significant weight gain over the control group that received none at all.

The low-dosage group, i.e. that which had been drinking water containing the minimum concentration of sodium nitrate, showed some improvement in average body weight over the controls and high-dosage group; however, the surprise came when it was found that the middle-dosage group (675 p.p.m.) had demonstrated an average weight gain over the control group of 0.9 lb. in only 21 weeks. This was indeed unexpected and, furthermore, as indicated by the last column in the table, none of the test groups consumed any more water than the control group. Another group of poults (not tabulated) were given drinking water containing 1.8% epsom salts from the time they hatched until four weeks of age and these birds showed a water/gain consumption ratio of 6.3 instead of the 4.9 or 5.0 shown in the table; therefore, it certainly appeared that even extremely high levels of sodium nitrate in the water had little, if any, effect upon the drinking habits of the birds.

Thus, the very early experiments provided convincing evidence that bronze male turkey poults would undergo a significant increase in weight by the time they reached market age if, during the first month of their lives, they were given drinking water containing between approximately 200 and 2000 p.p.m. sodium nitrate on a contained nitrate basis with the best results being achieved at about the 600 to 700 p.p.m. level. Subsequent experiments have confirmed and reinforced these early findings as will appear shortly. Amazingly enough, apart from finding that the same treatment was partially effective with female bronze turkeys, subsequent experiments have done little to establish the efficacy of the treatment for other poultry species or otherwise improve upon its use with male bronze turkeys.

In attempting to learn more about the treatment it was, of course, desirable to try and reproduce our earlier experimental data which was done as shown in the first two lines of Table II.

TABLE II.—EFFECT OF SUPPLEMENTAL NITRATES ON BRONZE TURKEYS (MALE)

| Treatment to 4 weeks | 4 weeks (lbs.) | 8 weeks (lbs.) | 16 weeks (lbs.) |
|---|---|---|---|
| Control (none) | 1.32 | 4.04 | 11.5 |
| $NaNO_3-H_2O$ | 1.32 | 4.17 | 12.3 |
| $NaNO_3$-feed | 1.26 | 3.86 | 11.6 |
| $KNO_3-H_2O$ | 1.30 | 4.00 | 11.4 |

The strain of turkeys used in this experiment was different and substantially smaller than that of the experiment reported in Table I. For this reason, the sodium nitrate dosage was dropped down to about 575 p.p.m. on a contained nitrate basis. Note that, even though there was no weight gain at four weeks and very little at eight weeks, these birds demonstrated an average weight gain of 0.8 lb. as early as sixteen weeks. Obviously, this experiment confirmed the earlier findings.

In addition to repeating the experiment reported in Table I, it was decided to check out a couple of other aspects of the treatment at the same time. First of all, it would be much easier to introduce the sodium nitrate into the feed rather than the drinking water. Accordingly, having determined that growing turkeys consume about two pounds of water per pound of feed, 1000 p.p.m. sodium nitrate on a contained nitrate basis was added to the feed compared with 575 p.p.m. on the same basis added to the drinking water. The third line of Table II shows the results and, strangely, nothing happened as is evident from the fact that the poults receiving the sodium nitrate in their feed fared just about the same as the control group.

The remaining phase of the experiment reported in Table II was to determine if the sodium was necessary to induce the desired growth response. To determine this, the same amount of nitrate (575 p.p.m.) was introduced into the birds' drinking water in the form of potassium rather than sodium nitrate. It is apparent from looking at the data reported in the last line of Table II that the sodium is definitely necessary as the potassium nitrate produced no increased growth pattern whatsoever.

The identical experiment described above (Table II) was repeated using bronze female turkeys in place of bronze males. The results are reported below in Table III.

TABLE III.—EFFECT OF SUPPLEMENTAL NITRATES ON BRONZE TURKEYS (FEMALE)

| Treatment to 4 weeks | 4 weeks (lbs.) | 8 weeks (lbs.) | 16 weeks (lbs.) |
|---|---|---|---|
| Control (none) | 1.19 | 3.42 | 8.7 |
| $NaNO_3-H_2O$ | 1.21 | 3.44 | [1] 9.0 |
| $NaNO_3$-Feed | 1.15 | 3.24 | [1] 8.4 |
| $KNO_3-H_2O$ | 1.19 | 3.20 | [1] 8.4 |

[1] 9.0 lbs. was significantly greater ($P<.05$) body weight than 8.4 lbs.

While the females reacted similarly to the males in that they showed a significantly larger sixteen week body size, their gain was not as great as that of the males and subsequent experiments have borne out these same results. Note that, once again, placing sodium nitrate in the feed rather than the water had no effect as was the case with giving the female poults the nitrate in the form of potassium rather than sodium nitrate.

It was, of course, quite important to determine if the treatment was effective on turkeys of other than the bronze type and on other market poultry like chickens. Two experiments in all were conducted on white rather than bronze turkeys, the results of only one of which are reported herein because both experiments proved the treatment to be totally ineffective as evidenced by the data reported below in Table IV. The sodium nitrate was given to both males and females in their drinking water at the same level as had been administered to the bronze turkeys and for the same period.

TABLE IV.—EFFECT OF SODIUM NITRATE IN DRINKING WATER FOR WHITE TURKEYS

| Treatment | Avg. body wt. (lbs.) | | 20 wks. | |
|---|---|---|---|---|
| | 4 wks. | 12 wks. | Females | Males |
| None | 1.03 | 6.1 | 10.8 | 15.2 |
| $NaNO_3$ | 1.02 | 6.0 | 11.1 | 15.0 |

When the experiment reported in Table I was repeated on single comb white leghorn chicks, there was no significant weight gain. Thus, it appeared that the treatment was effective only upon bronze turkeys and not upon other varieties of market poultry.

The experiments using potassium nitrate as a substitute for sodium nitrate (Tables II and III) had already established the need for the sodium cation; however, it was unknown up to this point whether the nitrate anion was also a necessary component of the compound. Accordingly, as shown by the results tabulated in Table V, the sodium was administered to the poults (bronze males) with other anions, namely, chloride and bicarbonate and, once again, an attempt was made to achieve some improvement by putting the sodium nitrate in the feed rather than the drinking water.

TABLE V.—EFFECT OF SUPPLEMENTAL SODIUM SALTS ON BRONZE TURKEYS (MALE)

| Treatment | Sodium (p.p.m.) | Avg. body wt. (lbs.) | | |
|---|---|---|---|---|
| | | 8 wks. | 16 wks. | 24 wks. |
| Control | 0 | 4.65 | 14.0 | 26.4 |
| $NaNO_3$ | 210 | 4.69 | 14.4 | 27.2 |
| $NaNO_3$ [a] | 370 | 4.59 | 13.6 | 26.1 |
| NaCL | 210 | 4.65 | 14.2 | 26.5 |
| $NaHCO_3$ | 210 | 4.57 | 13.6 | 26.0 |

[a] In feed rather than in drinking water.

Note that the results reported above are on the basis of contained sodium rather than contained nitrate as was the case previously. Also, where the sodium nitrate was administered in the feed rather than the drinking water (Treatment 3), the sodium concentration is increased to compensate for the lesser quantity of feed consumed than water. Once again, all of the poults tested compared almost identically with the control group of each stage in their development except for the group given the sodium nitrate in their drinking water (Treatment 2) which showed only slightly less than a pound weight gain at 24 weeks. As with the other experiments reported thus far, unless stated otherwise, the additives were administered from the hatching date up through four weeks of age and then discontinued because it was not until later that an experiment was run to determine, if possible, the optimum length of time over which to continue the treatment. The data reported in Table V, once again, verified the finding that the sodium nitrate must be administered through the drinking water for best results and it is ineffective when mixed with the dry poultry feed. The important finding, however, was that the nitrate anion was also necessary and that sodium in the form of some other soluble salt proved totally ineffective. In a companion experiment which was identical to that reported in Table V except that bronze females rather than males were used, the sodium chloride proved ineffective as did the sodium nitrate when administered in the dry feed. There was some indication that the sodium bicarbonate might have some beneficial effect, but the differences were so slight that statistically the results were indeterminate.

Another test using 100 bronze male poults per treatment was conducted with the primary purpose of getting more data on the preferred length of treatment. Once more, a group was included which, instead of receiving sodium nitrate at the level of 675 p.p.m. in their drinking water, was given 1500 p.p.m. contained nitrate in the form of sodium nitrate mixed into their dry feed. As was the case before, the dry diet proved to be ineffective as was expected by now. Luckily, it appeared that the four week treatment selected more or less arbitrarily for the early tests was a wise choice because the two week treatment showed no improvement over the control group and there appeared to be a significant diminution of the effect if the treatment was continued for a full six weeks, all of which is readily apparent from the following Table VI.

TABLE VI.—EFFECT OF VARIED EXPOSURE TO SODIUM NITRATE

| Sodium nitrate [1] treatment | Avg. body wt. (lbs.) | | |
|---|---|---|---|
| | 8 wks. | 16 wks. | 22 wks. |
| None | 8.8 | 14.9 | 25.6 |
| 2 weeks | 8.8 | 14.8 | 25.3 |
| 4 weeks | 8.9 | 15.0 | 26.5 |
| 6 weeks | 8.8 | 14.8 | 26.1 |
| 4 weeks [2] | 8.6 | 14.4 | 25.6 |
| Least sig. diff. (P <.05) | | | 1.0 |

[1] 675 p.p.m. $NO_3$ in drinking water.
[2] 1500 p.p.m. $NO_3$ in dry diet, none in water.

We were able to conclude, therefore, that the treatment should be begun at the hatching date or shortly thereafter and continued for more than two weeks but less than six weeks, with about four weeks appearing to be the best so far. In the above data, the "Least significant difference" figure shown on the last line means that the body weight difference had to exceed 1.0 lb. at 22 weeks of age in order to be different from the controls at the 5% level of significance.

In Table VII which follows, data taken from five of the tests reported herein has been consolidated and averaged to provide a comparison. It becomes quite obvious that a very significant weight gain was demonstrated in all of the bronze male turkeys with some improvement being noted in the females of the species.

TABLE VII

| Table | $NaNO_3$ (p.p.m.) | Body size increase (percent) | |
|---|---|---|---|
| | | Females | Males |
| I | 925 | | 4.2 |
| II and III | 790 | 2.2 | 2.1 |
| V | 925 | | 3.0 |
| VI | 925 | | 3.5 |
| Average | | 2.2 | 3.2 |

From the foregoing, together with certain other experiments, one can conclude that both male and female bronze turkeys benefited in terms of an improved, even though delayed, growth response when given substantial concentrations of sodium nitrate dissolved in their drinking water. The males of the species seem to respond to the treatment about twice as well as the females. Strangely, the treatment is totally ineffective upon white turkey poults and, apparently, other market poultry such as, for example, white leghorn chickens.

The manner of administering the sodium nitrate appears to be quite important because the improved growth pattern was only realized when the compound was introduced into the diet dissolved in the drinking water despite repeated attempts to accomplish the same thing through incorporation of the substance as an additive to the dry feed. Also, experiments with potassium nitrate, sodium chloride and sodium bicarbonate established that neither the sodium cation nor the nitrate anion were solely responsible for the beneficial results, but instead, both ions were needed.

As far as the period of treatment is concerned, it seems well established that the poults should, preferably, be started on the sodium nitrate as soon as they are hatched, although logic would indicate that some delay would have little, if any, permanent effect on the growth response except, perhaps, to delay the ultimate weight gain a bit longer. If the poults are going to receive the treatment, there would seem to be no logical reason for not starting them out on it; therefore, the above question is not really very important.

The duration of the treatment, on the other hand, is of considerably more importance. The experimental results definitely indicate that two weeks is too short a time to continue the treatment as no statistically significant weight gain was found in those birds receiving the sodium nitrate for this interval. As previously mentioned, the four week treatment period gave by far the best results in all of the experiments conducted thus far. Continuing the treatment beyond four weeks to six weeks failed to bring about any further improvement in the growth response and, in fact, there was some slight indication of a weight loss in comparison with the four week treatment. On the other hand, it does not appear to be especially detrimental to continue the treatment beyond the four week period except, of course, that the expense of prolonging the treatment, though minimal, continues and seems to be accomplishing very little, if anything.

One can safely conclude that the treatment should be continued for longer than two weeks, but probably not beyond six weeks, with the optimum period being somewhere in the neighborhood of four weeks. It is perfectly obvious that, say, a three week treatment or a five week one is going to produce some weight gain improvement even though maybe not the best, although, conceivably, one of these periods might even be preferable to the four week one under certain specific circumstances. Even so, the experiments indicate that the four week treatment is the best compromise despite the fact that it will probably not always be optimum.

Somewhat the same thing is true of the dosage level. Dosages as low as around 200 p.p.m. (Table I) gave evidence of producing the desired delayed growth response, although not to the extent realized when the dosage was trebled. One is forced to conclude, therefore, that the range of operative dosages must include as its lower limit something approximating 200 p.p.m.

On the high end, the 2000 p.p.m. dose resulted in poults at around market age (21 weeks) having approximately the same weight as the controls (Table I), although there was evidence of significant retardation in early growth as shown by the four and eight week body weights. Thus, one can safely conclude that 2000 p.p.m. is too high a maximum dose.

Roughly 700 p.p.m. (actually 675 p.p.m.) sodium nitrate on a contained nitrate basis gave excellent results in every instance where this dosage was used, although less than 600 p.p.m. (575) gave quite comparable results in the tests performed on the lightweight birds (Tables II and III). From these test results, one is able to conclude that the dosage range should be from approximately 200 p.p.m. on a contained nitrate basis up to a maximum of less than 2000 p.p.m., with the optimum being in the vicinity of 600 to 700 p.p.m.

All during the course of the aforementioned experiments, continuing efforts were being made to determine why the treatment worked the way it did. One plausible theory was that the sodium nitrate brought about a reduction in thyroid activity which, in turn, reduced the metabolic rate and allowed more energy to be retained due to less being required to maintain normal body functions. Without going into detail, an experiment designed to show whether any appreciable differences in thyroid size occurred proved inconclusive. Later experiments, likewise, showed a remarkable uniformity in thyroid size between the test poults and controls. This theory was finally abandoned when, upon determination of the radioiodide trapping rate of the thyroid, there was no significant difference in thyroid activity between the control group and birds receiving the treatment.

Many other experiments were conducted, some with the purpose in mind of finding out what was taking place as in the previously-mentioned thyroid study, while other tests were run to determine, if possible, whether the treatment brought about any undesirable side reactions. These tests showed no significant differences in such items as red blood cell concentration, blood sugar concentration, blood fat concentration, adrenal size or spleen size. There did, however, appear to be an indication of a reduction in testes size that warranted further investigation and, possibly, might explain the efficacy of the treatment upon the theory of a derangement of sexual hormone metabolism. A later experiment showed the average testes weights to be about the same and the individual tests weights could not be correlated with either body size or the nitrate treatment. So far, this investigation has proven inconclusive and, until more is known, one should probably refrain from giving the nitrate treatment forming the subject matter hereof to potential breeding stock.

About the only other experiment worthy of specific mention was that designed to determine the effect of the treatment on the methemoglobin content of the blood. As previously mentioned, some bacteria can easily change "nitrates" to "nitrites" and the latter change blood "hemoglobin" to "methemoglobin." Fortunately, the results of this experiment showed a reduction rather than an increase in blood methemoglobin and there appeared to be nothing to worry about on this score.

So far, at least, there have been no indications of harmful side effects resulting from the use of the treatment. Also, turkeys are known to be able to tolerate sodium nitrate at levels as high as 2000 p.p.m. on a contained nitrate basis for as long as 24 weeks without it becoming harmful to them.

Having thus described the several useful and novel features of the method for improving the weight gain in bronze turkeys that forms the subject matter hereof, it will be apparent that the several objectives for which the method was developed have been realized. Even though but a single specific method of treatment has been disclosed, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The method of improving the weight gain in bronze turkeys which comprises: feeding the the newly-hatched male poults of said specie for a weight gaining effective period of at least two weeks, drinking water containing a weight gaining effective amount in excess of 300 p.p.m sodium nitrate dissolved therein.

2. The method of improving the weight gain in bronze turkeys which comprises: feeding the newly-hatched male poults of said specie for a period of more than two weeks but less than six weeks drinking water containing at least 300 p.p.m. but no more than 2800 p.p.m. sodium nitrate dissolved therein.

References Cited

Poultry Science, November 1966, vol. 45, No. 6, pp. 1215–1222, Adams et al.

STANLEY J. FRIEDMAN, Primary Examiner

A. J. ROBINSON, Assistant Examiner

U.S. Cl. X.R.

99—2

UNITED STATES PATENT OFFICE
CERTIFICATE OF CORRECTION

Patent No. 3,639,584  Dated February 1, 1972

Inventor(s) Eldon W. Kienholz

It is certified that error appears in the above-identified patent and that said Letters Patent are hereby corrected as shown below:

In the heading to the printed specification, line 4, the inventor's name "Eldon W. Klenholz" should read -- Eldon W. Kienholz --.

Signed and sealed this 21st day of November 1972.

(SEAL)
Attest:

EDWARD M. FLETCHER, JR.  ROBERT GOTTSCHALK
Attesting Officer  Commissioner of Patents